United States Patent
Zheng

(10) Patent No.: US 9,824,195 B2
(45) Date of Patent: *Nov. 21, 2017

(54) CALCULATING CONSECUTIVE MATCHES USING PARALLEL COMPUTING

(71) Applicant: Fortinet, Inc., Sunnyvale, CA (US)

(72) Inventor: Juneng Zheng, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,384

(22) Filed: Sep. 29, 2016

(65) Prior Publication Data

US 2017/0126713 A1 May 4, 2017

Related U.S. Application Data

(63) Continuation of application No. 15/186,442, filed on Jun. 18, 2016, now Pat. No. 9,727,307, and a (Continued)

(51) Int. Cl.
*G06F 21/00* (2013.01)
*G06F 21/12* (2013.01)
(Continued)

(52) U.S. Cl.
CPC ............ *G06F 21/125* (2013.01); *G06F 7/02* (2013.01); *G06F 17/30516* (2013.01);
(Continued)

(58) Field of Classification Search
None
See application file for complete search history.

(56) References Cited

U.S. PATENT DOCUMENTS 9,438,612 B1  9/2016 Zheng
2002/0184247 A1* 12/2002 Jokela ............... G06F 17/30516
(Continued)

OTHER PUBLICATIONS

Non-Final Rejection for U.S. Appl. No. 15/186,442 dated Nov. 2, 2016.
(Continued)

*Primary Examiner* — Hadi Armouche
*Assistant Examiner* — Andrew Steinle
(74) *Attorney, Agent, or Firm* — Hamilton, DeSanctis & Cha LLP

(57) ABSTRACT

Methods and systems for determining consecutive matches are provided. According to one embodiment, a class definition and a data stream are received by a network security device. The data stream is partitioned into multiple data blocks each containing N data segments. Each data block is processed in parallel to compute: (i) a value (F) indicating whether every data segment value meets the class definition; (ii) a value (L) indicating a number of consecutive data segment values meeting the class definition starting from the left; (iii) a value (M) indicating a maximum number of consecutive data segment values meeting the class definition; and (iv) a value (R) indicating a number of consecutive data segment values meeting the class definition starting from the right. Corresponding values for each data block are then aggregated to determine a maximum number of consecutive data segment values meeting the class definition for the entire data stream.

17 Claims, 8 Drawing Sheets

Related U.S. Application Data continuation of application No. 14/665,744, filed on Mar. 23, 2015, now Pat. No. 9,438,612.

(51) Int. Cl.
    *H04L 29/06*     (2006.01)
    *G06F 17/30*     (2006.01)
    *G06F 7/02*     (2006.01)
    *G06F 21/55*     (2013.01)

(52) U.S. Cl.
    CPC .......... *G06F 21/552* (2013.01); *G06F 21/554* (2013.01); *H04L 63/1416* (2013.01); *G06F 17/30982* (2013.01)

(56) References Cited

U.S. PATENT DOCUMENTS

| | | | |
|---|---|---|---|
| 2003/0190954 A1* | 10/2003 | Sitrick | A63F 13/00 463/35 |
| 2007/0150623 A1* | 6/2007 | Kravec | G06K 9/6202 710/1 |
| 2008/0050036 A1* | 2/2008 | Bulusu | G06F 17/145 382/281 |
| 2008/0208850 A1* | 8/2008 | Boyce | G06F 17/30985 |
| 2010/0266215 A1* | 10/2010 | Hua | G06K 9/62 382/229 |
| 2015/0169667 A1* | 6/2015 | Roth | G06F 17/30557 707/691 |
| 2016/0285895 A1 | 9/2016 | Zheng | |
| 2016/0299742 A1 | 10/2016 | Zheng | |

OTHER PUBLICATIONS

Non-Final Rejection for U.S. Appl. No. 14/665,744 dated Apr. 14, 2016.

Notice of Allowance for U.S Appl. No. 14/665,744 dated Aug. 2, 2016.

* cited by examiner

CALCULATING CONSECUTIVE MATCHES USING PARALLEL COMPUTING

CROSS-REFERENCE TO RELATED PATENTS

This application is a continuation of U.S. patent application Ser. No. 15/186,442, filed on Jun. 18, 2016, which was a continuation of U.S. Pat. No. 9,438,612, filed on Mar. 23, 2015, which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015-2016, Fortinet, Inc.

BACKGROUND

Field

Embodiments of the present invention generally relate to micro-programmed parallel data processing systems and methods thereof for determining a number of consecutive matches to a defined pattern exist within a given data stream. More particularly, embodiments of the present invention relate the use of a parallel computation of a number of consecutive members of a particular class definition exist within a data stream on which pattern matching, overflow pattern matching and/or regular expression matching is being performed.

Description of the Related Art

Many processing tasks require regular expression matching, pattern matching and/or other sequential comparisons of an input data stream to make important decisions, including, but not limited to, identification of undesired packets in the context of network security applications. Generally, computing devices performing such tasks, such as image processing devices, wireless signal processing devices and network security devices, count the number of consecutive matches found in a data stream to a particular pattern or patterns to make certain decisions. Counting the number of consecutive bits (e.g., zeros or ones) has been a subject of interest for quite some time; however, most of the existing solutions rely on sequential processing of the input data stream in order to determine the number of consecutive bits having a value of one or zero. With present day applications such as bioinformatics, medical diagnostics, molecular biology, traffic analysis, data compression, etc., where the associated data streams are typically very long, a sequential approach for determining the count of consecutive bits having a particular value or consecutive segments matching a particular pattern may take an inordinate amount of time.

A non-limiting example of an application in which a number of consecutive bits (e.g., representing Boolean results of a comparison of a data stream with a pattern) is used for decision-making includes an intrusion detection system (IDS) and/or an intrusion prevention system (IPS), which typically operates by collating and analysing network traffic flowing through a network. Software/hardware filters of various kinds are currently used as tools for detecting intrusion in both network-based and/or host-based computer systems. Network intrusion or attempts to intrude into a network can be detected through monitoring and analysis of the network traffic through software/hardware filters, where these filters are designed to identify predetermined traffic patterns of interest (also referred to as signatures) and generate alerts, block and/or quarantine suspicious traffic. For example, when a set of observed network activity is compared against a signature, a set of Boolean outputs may be produced in which a zero indicates a mismatch and a one indicates a match. Similarly, signatures can be generated to identify files or email communications containing certain known and/or unknown types of malware or malicious content. As such, in order to assess the degree of similarity or whether a particular data stream or set of observations matches a particular signature, network security systems, which may perform one or more of antivirus processing, spam detection, intrusion detection and the like, typically include a process that involves counting the number of consecutive bits (e.g., in the set of Boolean outputs) that have a particular value. This counting of consecutive bits having a particular value is common in a variety of types of pattern matching, and regular expression matching. Those skilled in the art will appreciate sequential processing of a data stream to update consecutive class counters, overflow-patterns and the like can create a performance bottleneck, thereby delaying downstream decision-making processes relying on the results of such sequential processing.

Another example in which the count of consecutive bits is used includes data compression. For example, a Run Length Encoding (RLE) process typically counts the number of consecutive bits (1 or 0) to store a data stream in compressed form. An input data stream is typically stored within and transmitted among computing devices in the form of zeros and ones, wherein in the context of a simplified example, data representing a black and white image may be divided into numerous pixels, and each pixel can be designated as either ON (1) or OFF (0), wherein such a method of storing images (for example) can consume a large amount of memory due to the large number of pixels in each image. Therefore, it is often desirable to store a representation of the image in a more compact/compressed form. Because each horizontal line of pixels often includes long strings of consecutive pixels that are ON or OFF, a representation of the image can be stored in a more compact form by storing the number of consecutive zeros followed by the number of consecutive ones, and so on.

There are numerous other applications, such as image processing, sequence alignment, string comparison, signature matching, lexicographic sequence analysis, phonetic sequences analysis, signal analysis and micro-array data analysis and the like, in which the count of consecutive bits or consecutive data segments having a particular property (e.g., meeting a particular class definition, matching a particular character set or consecutive alignment) plays an important role.

There is therefore a need for methods and systems for counting consecutive values using a parallel processing approach having the right balance of hardware acceleration and efficient software logic that is both scalable and provides a fast solution

SUMMARY

Methods and systems are described for counting consecutive matches within an input data stream to a defined pattern (e.g., satisfying a particular condition or conditions or membership within a defined class) to facilitate applications in pattern matching, regular expression matching and the like. According to one embodiment, a data stream having a defined number of data segments and a class definition for the data stream are received by a network security device. The received data stream is partitioned into a set of data blocks each containing N data segments. Each data block is processed in parallel to compute the following: (i) a first integer value (F) indicating whether each data segment value of the data block forms part of the class definition; (ii) a second integer value (L) indicating a number of consecutive data segment values that form part of the class definition starting from a left-hand side of the data block; (iii) a third integer value (M) indicating a maximum number of consecutive data segment values that form part of the class definition; and (iv) a fourth integer value (R) indicating a number of consecutive data segment values that form part of the class definition starting from the right-hand side of the data block. F, L, M and R values for each data block are then aggregated to determine, for the received data stream, a maximum number of consecutive data segment values in the received data stream that form part of the class definition.

Other features of embodiments of the present invention will be apparent from the accompanying drawings and from the detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
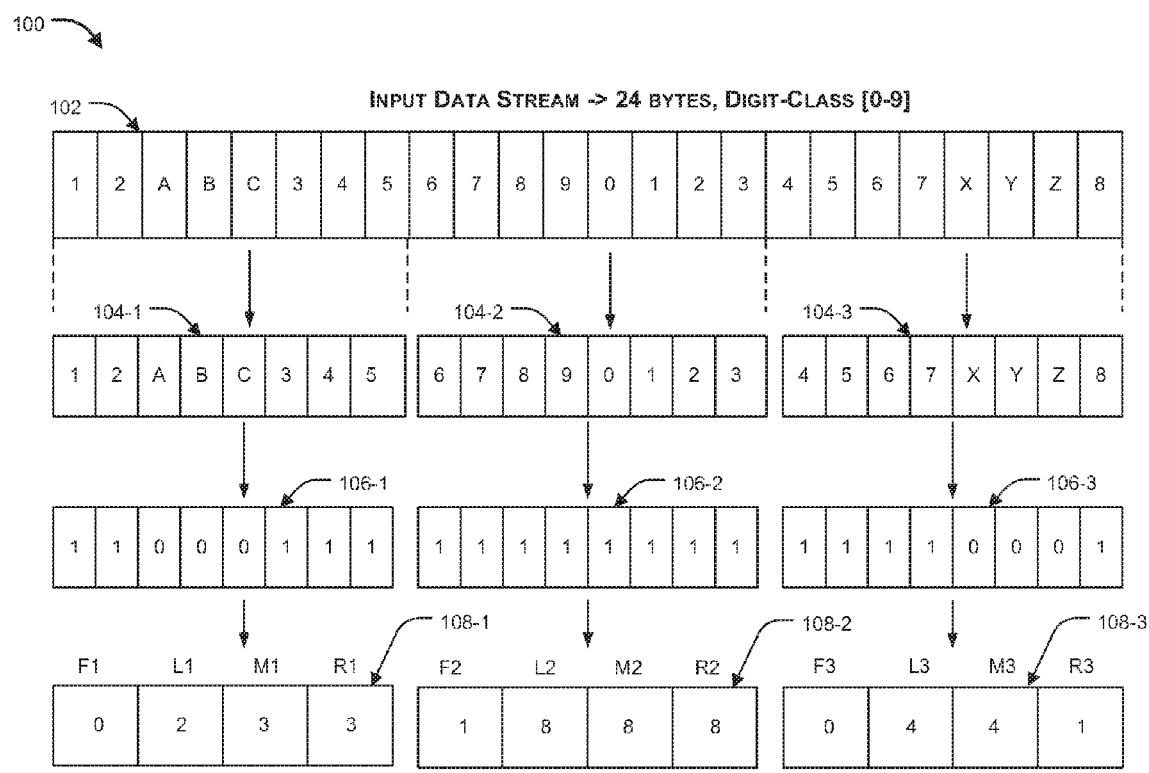
FIG. 1 is a simplified example illustrating partitioning of an input data stream into consecutive data blocks of data segments, and computation of corresponding quadruple integer values of the multiple consecutive data blocks in accordance with an embodiment of the present invention.

Methods and systems are described for counting consecutive matches within an input data stream to a defined pattern (e.g., satisfying a particular condition or conditions or membership within a defined class) to facilitate applications in pattern matching, regular expression matching and the like.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to one embodiment, a system of the present disclosure can be configured to receive an input data stream having a defined number of data segments and a class definition for the input data stream, and partition the received data stream into a set of consecutive data blocks, wherein each data block comprises 'n' data segments (such as characters, digits, or other arbitrary grouping of bits). A system of the present disclosure can further be configured to process each data block in parallel, and for each data block, compute, in parallel, a first integer value based on whether each segment value of the data block forms part of the class definition, a second integer value based on number of consecutive segment values that form part of the class definition from left, a third integer value based on maximum number of consecutive segment values that form part of the class definition, and a fourth integer value based on number of consecutive segment values that form part of the class definition from right. A system of the present disclosure can further be configured to process the first integer value, the second integer value, the third integer value, and the fourth integer value for each data block in a sequential and associative manner to determine, for the received data stream, maximum number of consecutive segment values in the data stream that form part of the class definition.

In an exemplary implementation, before generation of the four integer values, each individual data segment of a data block can be compared with pre-determined condition(s) (such as whether the data segment value is a member of a defined class or if it matches a corresponding character or digit in a predefined pattern) to result in an array of Boolean flags indicating whether the condition was found to be true or false for that particular data segment location within the data block. Based on such array of Boolean flags of each data block, the four integer values for the data block can be computed.

According to one embodiment, the first integer value is a flag value that is '1' when each data segment value of the data block forms part of the class definition, and is '0' when any of data segment value of the data block does not form part of the class definition.

According to one embodiment, the class definition can be selected from one or a combination of digits, alphabets, characters, special symbols, or any class defined in regular expression. According to another embodiment, each data block can be any of 8 bytes, 16 bytes, 32 bytes, or 64 bytes.

According to another embodiment, the proposed system can associatively integrate integer values of a first data block of the set of data blocks with integer values of a second data block of the set of data blocks to give updated integer values that are then processed with integer values of next data block of the set of data blocks, wherein first updated integer value is a multiplication of the first integer value of the first data block and first integer value of the second data block. Second updated integer value is a multiplication of first integer value of the first data block and second integer value of the second data block and then addition with second integer value of the first data block. Third updated integer value is maximum of third integer value of the first data block, third integer value of the second data block, and addition of fourth integer value of first data block and second integer value of the second data block. Fourth updated integer value is a multiplication of fourth integer value of the first data block and first integer value of the second data block, and then addition with fourth integer value of the second data block. According to one embodiment, the integration is associative.

According to another embodiment, the maximum number of consecutive bytes are used for any or a combination of pattern matching, overflow pattern matching, regular expression based matching, and network attack detection.

Aspects of the present disclosure further relate to a method including the steps of receiving an input data stream having a defined number of segments and a class definition for the input data stream, partitioning the received data stream into a set of data blocks, wherein each data block comprises 'n' data segments, and processing each data block in parallel, and for each data block, compute, in parallel, a first integer value based on whether each segment value of the data block forms part of the class definition, a second integer value based on number of consecutive segment values that form part of the class definition from left, a third integer value based on maximum number of consecutive segment values that form part of the class definition, and a fourth integer value based on number of consecutive segment values that form part of the class definition from right. The method can further include the step of processing the first integer value, the second integer value, the third integer value, and the fourth integer value for each data block in a sequential and associative manner to determine, for the received data stream, maximum number of consecutive segment values in the data stream that form part of the class definition.

Terminology

Brief definitions of terms used throughout this application are given below.

If the specification states a component or feature "may", "can", "could", or "might" be included or have a characteristic, that particular component or feature is not required to be included or have the characteristic.

The phase "network security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security devices (e.g., FORTIGATE family of network security devices and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 is a simplified example 100 illustrating partitioning of an input data stream 102 into consecutive data blocks of data segments, and computation of corresponding quadruple integer values of the multiple consecutive data blocks in accordance with an embodiment of the present invention. In the context of the present example, an input data stream 102 having, for instance, 24 bytes, "12ABC345678901234567XYZ8" is received along with information regarding predetermined pattern against which to compare input data stream 102. In this example, the predetermined pattern is in the form of a class definition defining a digit class as the numbers 0 to 9.

In order to facilitate parallel processing, input data stream 102 is partitioned into multiple consecutive data blocks. In the present example, the 24-byte input data stream 102 is partitioned into 3 data blocks 104-1, 104-2 and 104-3 each of 8 bytes—"12ABC345", "67890123", and "4567XYZ8" respectively. Each data block 104 can include a defined number of data segments (e.g., characters, digits or other arbitrary grouping of bits as appropriate for the particular implementation), each data segment has an associated value. For instance, data block 104-1 includes 8 data segments having respective values of 1, 2, A, B, C, 3, 4, and 5.

According to one embodiment, each data segment of each data block 104 can be compared in parallel to the predefined pattern to determine whether one or more predefined conditions with respect to the predefined patters are met and generate a corresponding array of Boolean flags 106-1, 106-2 and 106-3 indicating whether the condition(s) were found to be true or false for a particular data segment location in the corresponding data block 104-1, 104-2 and 104-3. In the context of the present example, the condition being evaluated is whether data segments of data blocks 104 meet the definition of a digit (i.e., represent an integer value between 0 and 9, inclusive). For instance, a condition can state that a Boolean flag for a given data segment is 1 (true) when the value of the particular data segment falls within the class definition and 0 (false) otherwise. Given such a condition, as shown in FIG. 1, for data block 104-1, the corresponding array 106-1 of Boolean flags can be represented for each data segment as 11000111, indicating the first two and last three data segment values of data block 104-1 are members of the digit class and the others are not. Similarly, other arrays of Boolean flags can be generated as 106-2 and 106-3, which correspond to the evaluation of data segments of data blocks 104-2 and 104-3 with respect to the defined digit class.

Continuing with the present example, once the arrays of Boolean flags 106 have been computed for each data block 104, a set of quadruple integer values 108-1, 108-2 and 108-3 can be computed for each data block 104. According to one embodiment, the set of quadruple integer values includes a Boolean flag, F, a counter, L, a counter, M, and a counter, R. The value of F for a given data block 104 is 1 (true) if all the Boolean flags of the corresponding array Boolean flags have a value of 1; otherwise F is 0. As such, in the context of the present example, F will be 1 if and only if all data segment values for a particular data block 104 are digits.

The value of L for a particular data block 104 represents the number of consecutive 1 s starting from the left-hand side of the corresponding array of Boolean flags 106. The value of M for a particular data block 104 represents the maximum number of consecutive is within the corresponding array of Boolean flags 106. The value R for a particular data block 104 represents the number of consecutive 1 s starting from the right-hand side of the corresponding array of Boolean flags 106. Therefore for array of Boolean flags 106-1 (corresponding to data block 104-1), F (F1) is 0 (as not all the values of the Boolean flags are 1), L (L1) is 2 as there are two consecutive is counting from the left-hand side of array of Boolean flags 106-1, M (M1) is 3 as there are a maximum of 3 consecutive Is within array of Boolean flags 106-1, and R (R1) is 3 as there are three consecutive is counting from the right-hand side of array of Boolean flags 106-1. Therefore, quadruple integer values 108-1 corresponding to data block 104-1 are [0, 2, 3, 3]. Similarly, the quadruple integer values F2, L2, M2, and R2 for data block 104-2, represented by 108-2, is [1, 8, 8, 8], and the quadruple integer values F3, L3, M3, and R3 for data block 104-3, represented by 108-3, is [0, 4, 4, 1].

FIG. 1 therefore demonstrates a simplified example of how data blocks, data segments, arrays of Boolean flags, and quadruple integer values are generated based on an input data stream, a predetermined pattern and a defined condition with respect to the data segments and the predetermined patters. As described further below, quadruple integer values for multiple consecutive data blocks 104 can be aggregated two at a time to create an updated set of quadruple integer values for the consecutive data blocks taken as a whole.

Figure 2:
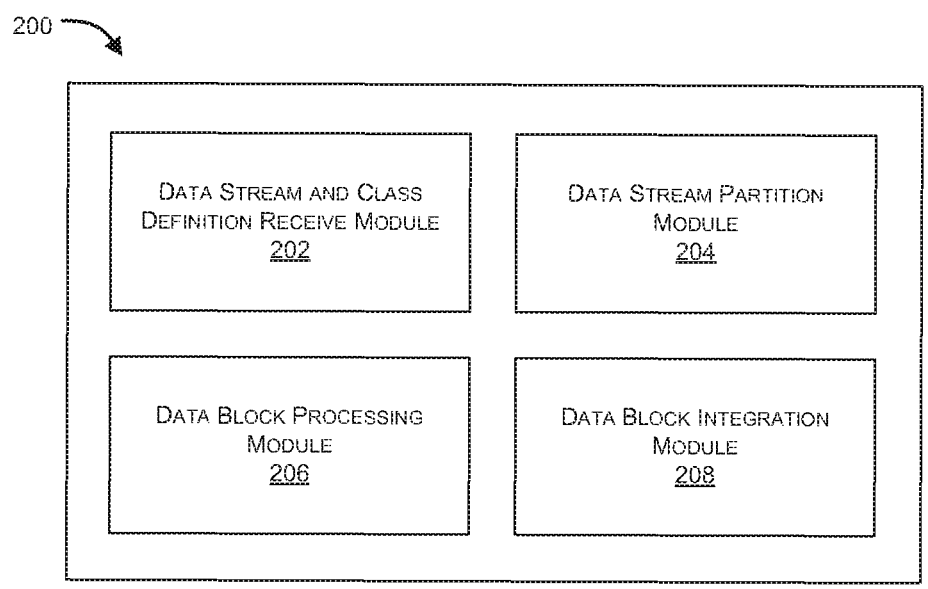
FIG. 2 illustrates exemplary functional modules for counting consecutive values meeting predetermined criteria using parallel processing in accordance with an embodiment of the present invention.

FIG. 2 illustrates exemplary functional modules 200 for counting consecutive values meeting predetermined criteria using parallel processing in accordance with an embodiment of the present invention. In the context of the present example, a system can include a data stream and class definition receive module 202, a data stream partition module 204, a data block processing module 206, and a data block integration module 208.

Data stream and class definition receive module 202 can be configured to receive an input data stream having a defined number of data segments and a class definition for the input data stream. The input data stream can be of any length and can include any of digits, characters, alphanumeric, special expressions, among other representations. According to one embodiment, the class definition can be selected from one or a combination of digits, alphabets, characters, special symbols, or any class defined by regular expression. For instance, the class definition can be a digit class, say [0-9], or say character class [A-Z and a-z], or a regular expression or any combination therefore. In an aspect, the class definition indicates a pattern sought to be identified, say to determine the maximum number of consecutive data segments having values meeting the class definition.

Data stream partition module 204 can be configured to partition the received data stream into a set of consecutive data blocks, wherein each data block comprises 'n' data segments (such as characters, digits, or other arbitrary grouping of bits). According to one embodiment, the size of each data block may be the same or different. Depending upon the particular implementation and depending upon the size and number of data blocks that can be processed in parallel, each data block may be any of 8 bytes, 16 bytes, 32 bytes, or 64 bytes, or any other configured size. For example, in the context of the example of FIG. 1, each core of a 4 core processor may be assigned a data block to process during each processor cycle.

Data block processing module 206 can be configured to process each data block in parallel, and for each data block, compute, in parallel, a first integer value (F) based on whether each data segment value of the data block forms part of the class definition, a second integer value (L) based on the number of consecutive data segment values that form part of the class definition starting from the left, a third integer value (M) based on the maximum number of consecutive data segment values that form part of the class definition, and a fourth integer value (R) based on number of consecutive data segment values that form part of the class definition starting from the right. In an exemplary implementation, before generation of the four integer values (F, L, M, R), each individual data segment of a data block can be compared with pre-determined condition(s) (such as whether the data segment value is a member of a defined class or if it matches a corresponding character or digit in a predefined pattern) to result in an array of Boolean flags indicating whether the condition was found to be true or false for that particular data segment location within the data block. Based on such array of Boolean flags of each data block, the four integer values for the data block can be computed.

Data block integration module 208 can be configured to process the first integer value F, the second integer value L, the third integer value M, and the fourth integer value R for each data block in a sequential and associative manner to determine, for the received data stream, a maximum number of consecutive data segment values in the data stream that form part of the class definition. According to one embodiment, data block integration module 208 associatively integrates integer values of consecutive data blocks by defining an addition operation ("+") on them based on the following equations:

$$(F,L,M,R)=(F1,L1,M1,R1)+(F2,L2,M2,R2) \qquad \text{EQ \#1}$$

$$F=F1*F2; \qquad \text{EQ \#2}$$

$$L=L1+F1*L2; \qquad \text{EQ \#3}$$

$$M=\max(M1,M2,R1+L2); \qquad \text{EQ \#4}$$

$$R=R1*F2+R2; \qquad \text{EQ \#5}$$

Therefore, a set of quadruple integer values of a first data block (F1, L1, M1, and R1) of two consecutive data blocks can be integrated with a set of quadruple integer values of a second data block (F2, L2, M2, and R2) of the two consecutive data blocks, resulting in a set of quadruple integer values (F12, L12, M12, and R12), representing F, L, M and R values for the two consecutive data blocks taken as a whole. According to one embodiment, the integration is associative. As such, this intermediate set of quadruple integer values can then be combined with the set of quadruple integer values of the next consecutive data block (F3, L3, M3, and R3). From EQ #2, the first updated integer value F12 represents a result of multiplying (or ANDing) of the first integer value F1 of the first data block and the first integer value F2 of the second data block. From EQ #3, the second updated integer value L12 represents the result of multiplying the first integer value F1 of the first data block and the second integer value L2 of the second data block and then adding the second integer value L1 of the first data block. From EQ #4, the third updated integer value M12 is the maximum of the third integer value M1 of the first data block, the third integer value M2 of the second data block, and the sum of the fourth integer value R1 of first data block and the second integer value L2 of the second data block. From EQ #5, the fourth updated integer value R12 is a result of multiplying the fourth integer value R1 of the first data block and the first integer value F2 of the second data block, and then adding that to the fourth integer value R2 of the second data block.

According to another embodiment, the maximum number of consecutive matches may be used for any or a combination of pattern matching, overflow pattern matching, regular expression based matching, and network attack detection.

Figure 3:
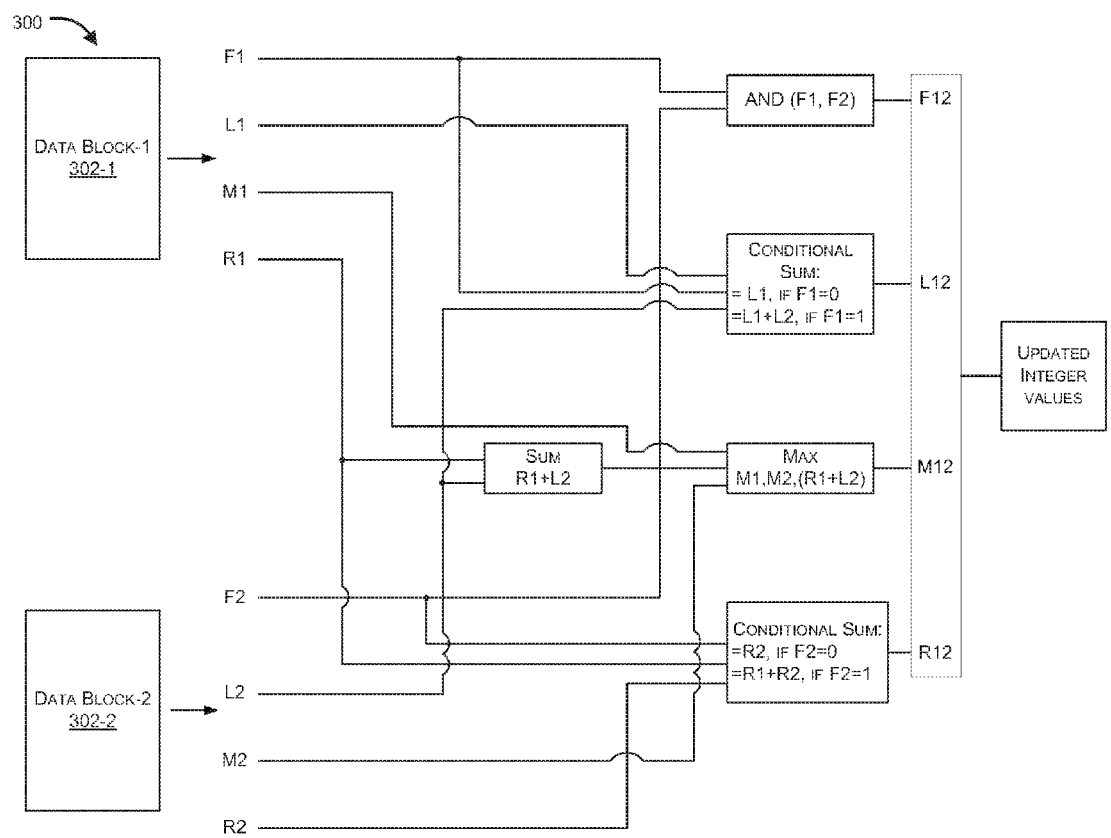
FIG. 3 illustrates in schematic form exemplary parallel processing of two quadruple integer values, each comprising a flag and three types of consecutive one counters, resulting from evaluating multiple data segments of two consecutive data blocks of a data stream and for generation of an updated flag and corresponding updated consecutive one counters corresponding to the two consecutive data blocks taken as a whole in accordance with an embodiment of the present invention.

FIG. 3 illustrates in schematic 300 form exemplary parallel processing of two quadruple integer values, each comprising a flag and three types of consecutive one counters, resulting from evaluating multiple data segments of two consecutive data blocks of a data stream and for generation of an updated flag and corresponding updated consecutive one counters corresponding to the two consecutive data blocks taken as a whole in accordance with an embodiment of the present invention. FIG. 3 represents integration of quadruple integer values (F, L, M, R) of two data blocks 302-1 and 302-2 having values as F1, L1, M1, R1 and F2, L2, M2, R2, respectively.

As can be seen, integration of quadruple integer values of two data blocks can generate updated quadruple integer values, which can then again be processed with quadruple integer values of subsequent data blocks 302 until all the data blocks 302 are processed. According to one embodiment, updated first integer value F12 represents the result of multiplying F1 and F2, which can also be represented as an ADD operation between F1 and F2 as F1/F2 are both Boolean values and hence multiplication or ADD operation would have the same effect.

Updated second integer value L12 can be a conditional sum operation, wherein L12 is equal to L1 if F1=0, else, L12 is equal to L1+L2 when F1=1. Alternatively, L12 can also be represented as L1+(F1*L2). According to another embodiment, updated third integer value M12 represents the maximum of M1, M2, and the sum of R1+L2. According to yet another embodiment, updated fourth integer value R12 can be a conditional sum operation, wherein R12 is equal to R2 if F2=0, else, R12 is equal to R1+R2 when F2=1. Alternatively, R12 can also be represented as (R1*F2)+R2.

Figure 4:
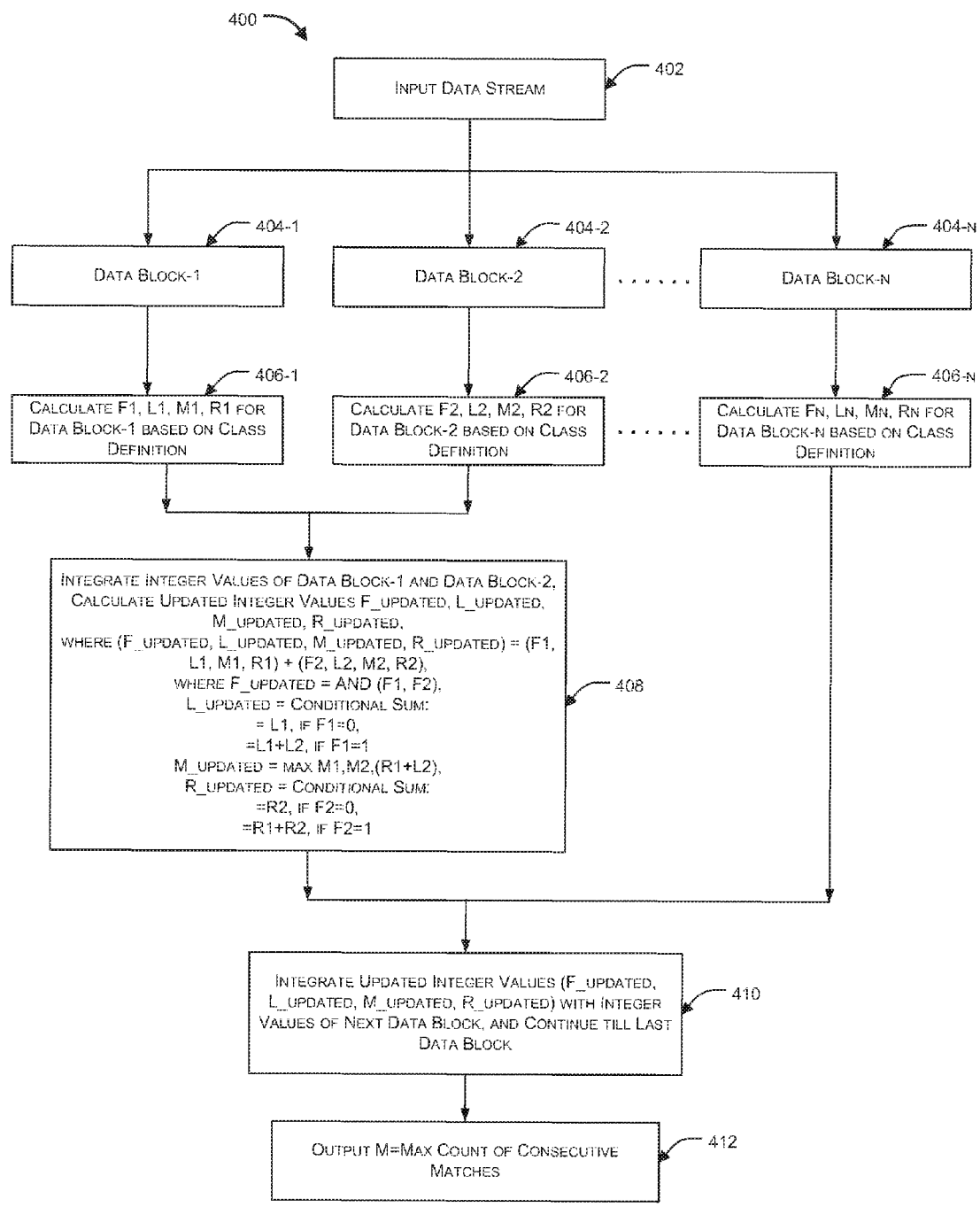
FIG. 4 conceptually illustrates exemplary aggregation and processing of N quadruple integer values corresponding to N consecutive data blocks to determine a maximum number of consecutive ones across corresponding groups of Boolean flags resulting from matching performed against individual segments of the N consecutive data blocks in accordance with an embodiment of the present invention.

FIG. 4 conceptually illustrates exemplary aggregation and processing of N quadruple integer values corresponding to N consecutive data blocks to determine a maximum number of consecutive ones across corresponding groups of Boolean flags resulting from matching performed against individual segments of the N consecutive data blocks in accordance with an embodiment of the present invention. Representation 400 shows an input data stream 402 that can be partitioned into one or more data blocks 404-1, 404-2, . . . , 404-N, wherein for each data block 404, quadruple integer values are computed as shown in 406-1, 406-2, . . . , 406-n based on whether the data segment values in each data block fall within the class definition. Once the quadruple integer values are generated for each data block, a process of sequential integration of the quadruple integer values can be initiated as shown in 408, wherein quadruple integer values for the first two data blocks 404-1 and 404-2 can first be integrated to generate F_updated, L_updated, M_updated, and R_updated, wherein F_updated is an AND operation between F1 and F2, L_updated is a conditional SUM operation where L_updated is equal to L1 when F1 is 0 and is equal to L1+L2 when F1=1. Similarly, M_updated can be computed as the maximum of M1, M2, and the sum of R1 and L2. R_updated can be computed as a conditional SUM operation with R_updated being equal to R2 when F2=0 and equal to R1+R2 when F2=1.

According to one embodiment, once the quadruple integer values for the first two data blocks 404-1 and 404-2 are integrated, the updated values (F_updated, L_updated, M_updated, and R_updated) can be processed with the quadruple integer values of the third data block 404-3, which process can be continued until all the data blocks are processed. Once done, the value of the final M represents the maximum count of consecutive matches across all data blocks 404 based on the class definition criteria.

Figure 5:
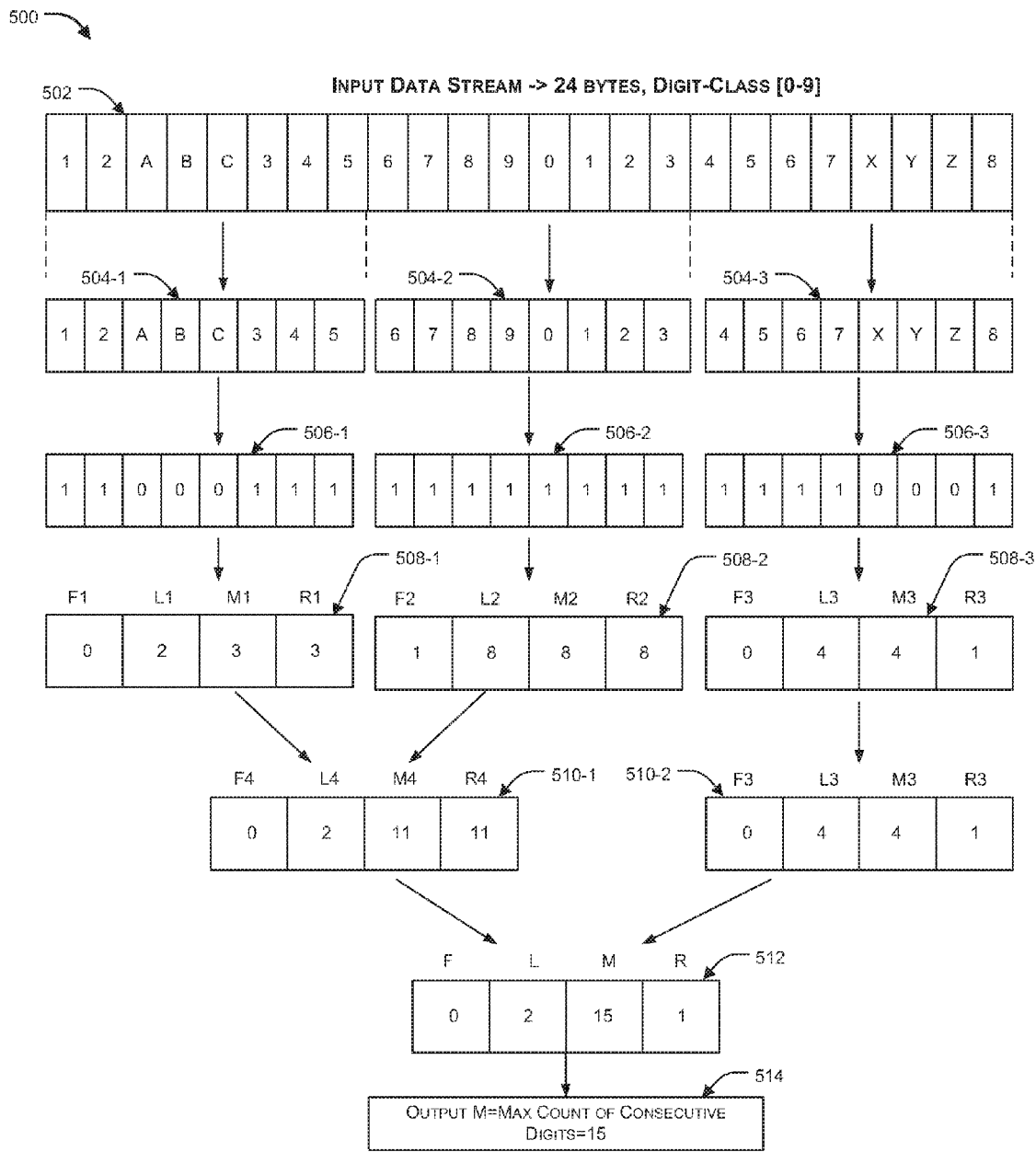
FIG. 5 is a simplified example illustrating partitioning of an input data stream into consecutive data blocks of data segments and computation and processing of corresponding quadruple integer values of the multiple consecutive data blocks to generate intermediate updated quadruple integer values and ultimately a final count representing the maximum consecutive matches in the input data stream in accordance with an embodiment of the present invention.

FIG. 5 is a simplified example illustrating partitioning of an input data stream 502 into consecutive data blocks 504-1, 504-2 and 504-3 of data segments and computation and processing of corresponding quadruple integer values of the multiple consecutive data blocks to generate intermediate updated quadruple integer values 508-1, 508-2 and 508-3 and ultimately a final count representing the maximum consecutive matches in the input data stream in accordance with an embodiment of the present invention. FIG. 5 generally corresponds to the representation of FIG. 1, but proceeds to aggregate the F, L, M and R values for each data block 504 to produce results representative of data blocks 504 as a whole. In the context of the present example, an input data stream 502 is received, partitioned into three data blocks 504-1, 504-2, and 504-3, wherein for each data block 504, an array of Boolean flags 506-1, 506-2 and 506-3 is be generated corresponding to the data segment values of the respective data blocks 504-1, 504-2 and 504-3. For instance, based on the class definition of digit class [0-9] and the data segment values of data block 504-1 a corresponding flag can be generated indicating whether the data segment value meets the class definition.

Once the array of Boolean values is generated for each data block, quadruple integer values can be computed for each data block. For instance, the quadruple integer values for data block 504-1 are [0, 2, 3, 3], for data block 504-2 the quadruple integer values are [1, 8, 8, 8] and for data block 504-3 the quadruple integer values are [0, 4, 4, 1]. Once generated, the quadruple integer values for data blocks 504-1 and 504-2 can be aggregated to generate [0, 2, 11, 11] based on EQ #2-5 (above).

Once the updated quadruple integer values F4, L4, M4 and R4 are generated at 510-1, these values can be aggregated with quadruple integer values F3, L3, M3 and R3 of the third data block 510-2 to generate a final set of updated quadruple integer values F, L, M and R as [0, 2, 15, 1], wherein the value of M=15 can be output to identify the maximum number of consecutive digits within input data stream 502. Although the present example is illustrated with respect to a relatively short input data stream, those of ordinary skill in the art will appreciate the methods and systems described herein are applicable to input data streams of any length.

Figure 6:
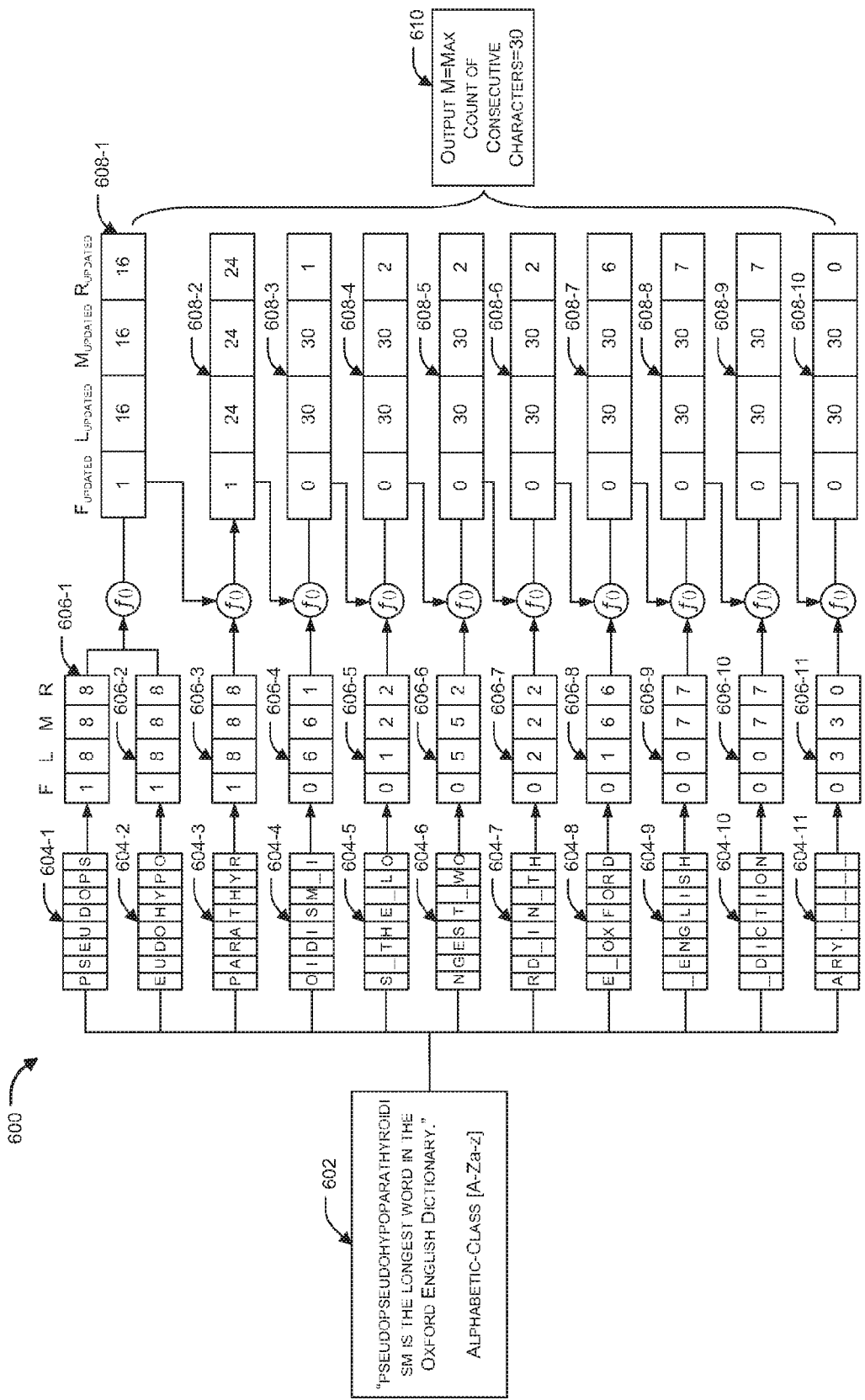
FIG. 6 illustrates another example showing partitioning of an input data stream into data blocks of data segments, computation of corresponding quadruple integer values of the multiple consecutive data blocks and aggregation of quadruple integer values in accordance with an embodiment of the present invention.

FIG. 6 illustrates another example showing partitioning of an input data stream 602 into data blocks 604 of data segments, computation of corresponding quadruple integer values 606 of the multiple consecutive data blocks and aggregation of quadruple integer values in accordance with an embodiment of the present invention.

As shown in FIG. 6, input data stream 602 can be "PSEUDOPSEUDOHYPOPARATHYROIDISM is the longest word in the Oxford English dictionary.", which has a total of 84 characters. The alphabet class can be defined as the letters A-Z or the letters a-z. Assuming the underlying hardware supports processing of 8 characters per cycle, the input stream 602 can be partitioned into 11 8-character data blocks 604-1, 604-2, . . . 604-11, wherein the last block can be padded with four non-alphabetic characters, e.g., four spaces. Once partitioned, quadruple integer values can be computed as shown in 606-1 to 606-11 for each of the corresponding data blocks 604-1 to 604-11. The generated quadruple integer values can then be processed with each other in sequence, wherein the first two sets of quadruple integer values 606-1 and 606-2 can be aggregated with each other to generate updated quadruple integer values 608-1, wherein the updated quadruple integer values 608-1 can then be aggregated with the third quadruple integer values 606-3 to generate 608-2, which can then be aggregated with 606-4 to generate 608-3, and so on. The final updated set of quadruple integer values 608-10 contains an M value of 30, which correctly represents the maximum number of consecutive alphabetic characters within input stream 602.

Figure 7:
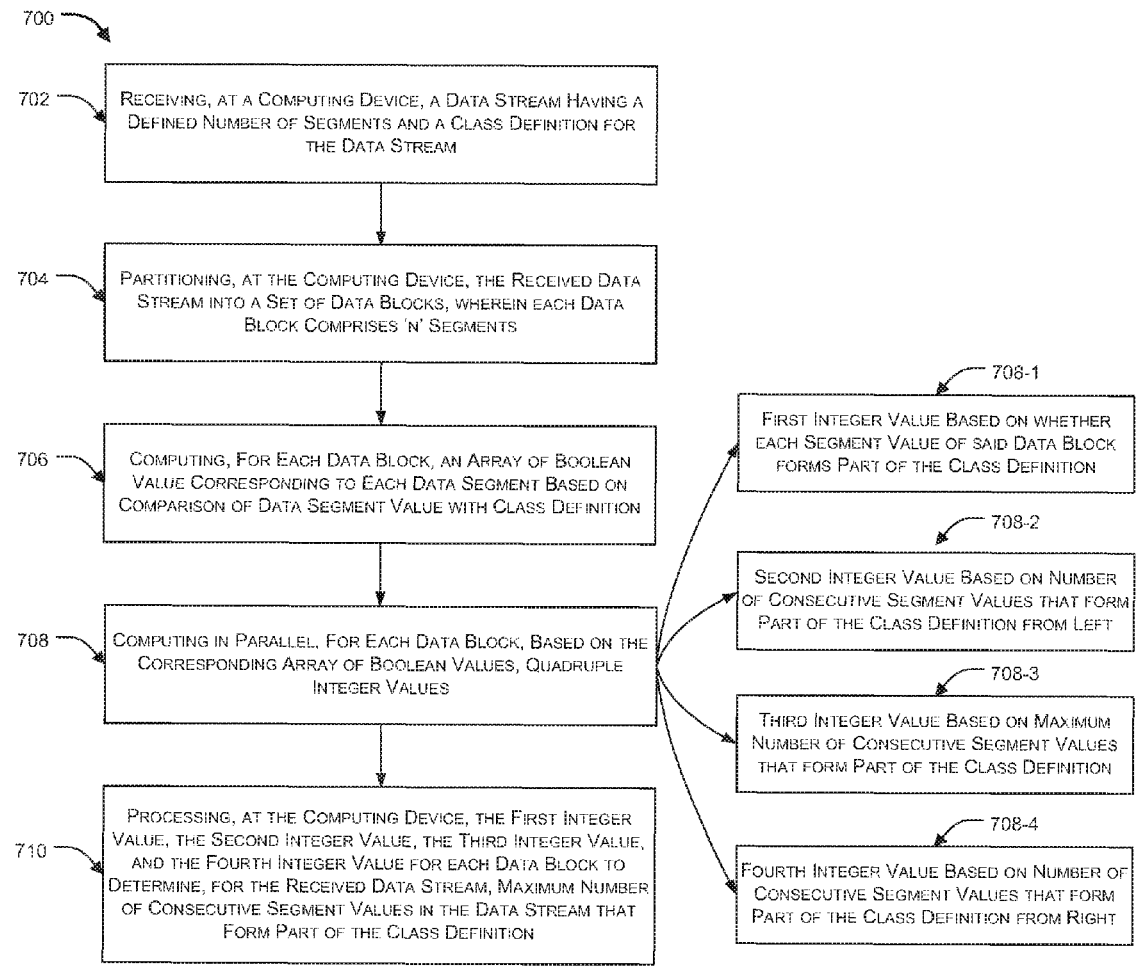
FIG. 7 illustrates an exemplary flow diagram for counting consecutive matches for an input data stream using parallel processing in accordance with an embodiment of the present invention.

FIG. 7 illustrates an exemplary flow diagram 700 for counting consecutive matches for an input data stream using parallel processing in accordance with an embodiment of the present invention. At block 702, an input data stream is received having a defined number of segments. A predetermined pattern to which the input data stream is to be compared may also be received. In the context of the present example, the predetermined pattern is defined in terms of a class definition. At block 704, the received data stream is partitioned into a set of data blocks, wherein each data block comprises 'n' segments. At block 706, each data block can be processed to generate an array of Boolean values based on individual data segments of the data block meeting one or more predetermined condition(s) with respect to the predetermined pattern. For example, determining whether the data segment value is a member of a defined class or whether the data segment value matches a corresponding character or digit in a predefined pattern. In one embodiment, the corresponding value of a particular position of the array of Boolean values indicates whether the condition was found to be true or false for that particular data segment location within the data block.

At block 708, a set of quadruple integer values is calculated in parallel for each data block based on the corresponding array of Boolean values. At sub-block 708-1, a first integer value (F) is calculated based on whether every data segment value of the data block forms part of the class definition. At sub-block 708-2, a second integer value (L) is calculated based on the number of consecutive data segment values that form part of the class definition starting from the left-hand side of the data block. At sub-block 708-3, a third integer value (M) is calculated based on the maximum number of consecutive data segment values within the data block that form part of the class definition. At sub-block 708-4 a fourth integer value (R) is calculated based on the number of consecutive data segment values that form part of the class definition starting from the from right-hand side of the data block.

At block 710, the first integer value (F), the second integer value (L), the third integer value (M), and the fourth integer value (R) for each data block are aggregated in a sequential and associative manner to determine, for the received data stream, the maximum number of consecutive segment values (M) in the data stream that form part of the class definition.

Figure 8:
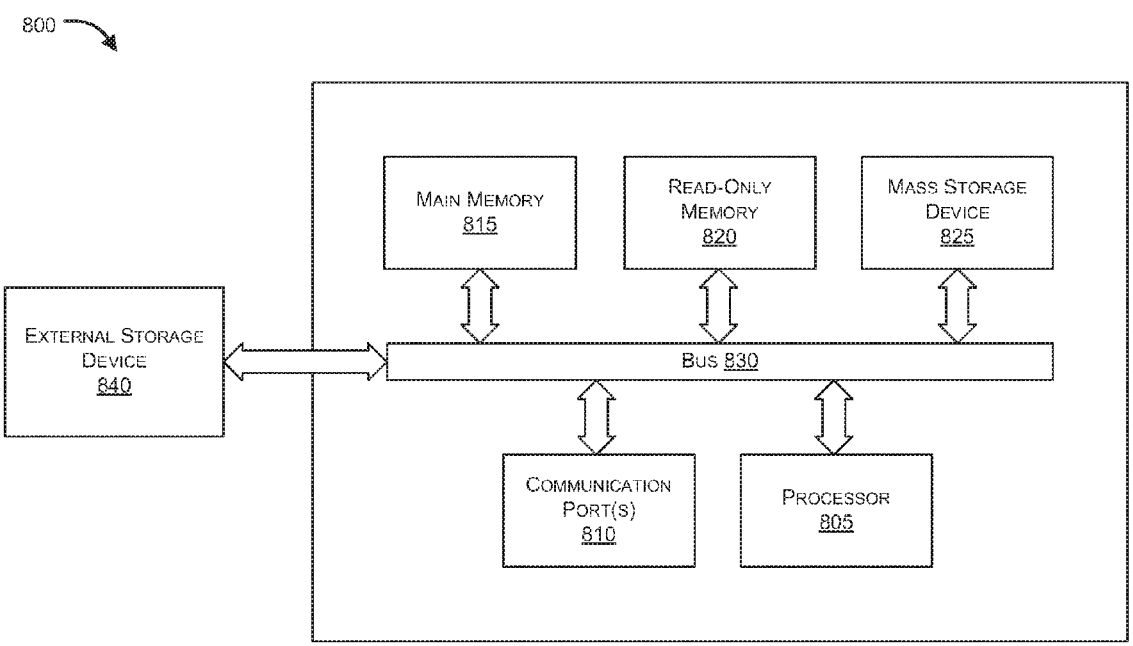
FIG. 8 illustrates an exemplary computer system in accordance with an embodiment of the present invention.

FIG. 8 is an exemplary computer system 800 in which or with which embodiments of the present invention may be utilized. Computer system 800 may represent, include and/or form a part of an intrusion prevention system, a content processing system, a content processing Application Specific Integrated Circuit (ASIC) or other network security devices.

Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with embodiments of the present invention.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K 1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present invention.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

The invention claimed is:

1. A system comprising:
a non-transitory storage device having embodied therein one or more routines; and
one or more processors coupled to the non-transitory storage device and configured to execute the one or more routines, wherein the one or more routines include:
   a data stream and class definition receive module, which when executed by the one or more processors receives a class definition and a a data stream associated with network traffic
   a data stream partition module, which when executed by the one or more processors partitions said received data stream into a set of data blocks, wherein each data block of the set of data blocks comprises N data segments;
   a data block processing module, which when executed by the one or more processors processes each data block of the set of data blocks in parallel by for each data block of the set of data blocks, computing the following:
      a first integer value based on whether each segment value of the data block forms part of the class definition;
      a second integer value based on a number of consecutive data segment values that form part of the class definition starting from a left-hand side of the data block;
      a third integer value based on a maximum number of consecutive data segment values in the data block that form part of the class definition; and
      a fourth integer value based on a number of consecutive data segment values that form part of the class definition starting from a right-hand side of the data block;
   a data block integration module, which when executed by the one or more processors aggregates the first integer value, the second integer value, the third integer value, and the fourth integer value for each data block of the set of data blocks in a sequential and associative manner to determine, for the received data stream, a maximum number of consecutive data segment values in the received data stream that form part of the class definition; and
   wherein the maximum number of consecutive data segment values is used in connection with identifying potential malicious content within the network traffic or intrusion detection processing relating to the network traffic.

2. The system of claim 1, wherein said class definition is selected from one or a combination of digits, alphabets, characters, special symbols, or any class defined by a regular expression.

3. The system of claim 1, wherein each data block of the set of data blocks is any of 8 bytes, 16 bytes, 32 bytes, or 64 bytes.

4. The system of claim 1, wherein a corresponding Boolean flag is determined for each data segment value of each data block of the set of data blocks by comparing the data segment value to the class definition.

5. The system of claim 1, wherein the first integer value is a flag value that is '1' when every data segment value of said data block forms part of the class definition, and is '0' when any of data segment values of said data block do not form part of the class definition.

6. The system of claim 1, wherein said data block integration module associatively integrates integer values of a first data block of the set of data blocks with integer values of a second data block of the set of data blocks to generate updated integer values that are then processed with integer values of a next data block of the set of data blocks, wherein the first updated integer value represents a result of multiplying the first integer value of said first data block and the first integer value of said second data block.

7. The system of claim 4, wherein the second updated integer value represents a result of multiplying the first integer value of said first data block and the second integer value of said second data block, and adding the result to the second integer value of said first data block.

8. The system of claim 4, wherein the third updated integer value represents a maximum of (i) the third integer value of said first data block, (ii) the third integer value of said second data block, and (iii) a sum of the fourth integer value of first data block and the second integer value of said second data block.

9. The system of claim 4, wherein the fourth updated integer value represents a result of multiplying the fourth integer value of said first data block and the first integer value of said second data block, and then adding the result to the fourth integer value of said second data block.

10. The system of claim 4, wherein said integration is associative.

11. A method comprising:
receiving, by a network security device, a class definition and a data stream associated with network traffic;
partitioning, by the network security device, said received data stream into a set of data blocks, wherein each data block of the set of data blocks comprises N data segments;
processing, by the network security device, each data block of the set of data blocks in parallel by, for each data block of the set of data blocks, computing the following:
  a first integer value (F) indicating whether each data segment value of said data block forms part of the class definition;
  a second integer value (L) indicating a number of consecutive data segment values that form part of the class definition starting from a left-hand side of the data block;
  a third integer value (M) indicating a maximum number of consecutive data segment values that form part of the class definition; and
  a fourth integer value (R) indicating a number of consecutive data segment values that form part of the class definition starting from the right-hand side of the data block;
aggregating, by the network security device, F, L, M and R for each data block of the set of data blocks in a sequential manner to determine, for the received data stream, a maximum number of consecutive data segment values in the received data stream that form part of the class definition; and
using, by the network security device, said maximum number of consecutive data segment values in connection with identifying potential malicious content within the network traffic or intrusion detection processing relating to the network traffic.

12. The method of claim 11, wherein said class definition is selected from one or a combination of digits, alphabets, characters, special symbols, or any class defined in regular expression.

13. The method of claim 11, wherein each data block of the set of data blocks is any of 8 bytes, 16 bytes, 32 bytes, or 64 bytes.

14. The method of claim 11, further comprising determining a corresponding Boolean flag for each data segment of each data block of the set of data blocks by comparing a value of the data segment to the class definition.

15. The method of claim 11, wherein F represents a flag value that is true when each and every data segment value of said data block forms part of the class definition, and is false when any of the data segment values of said data block do not form part of the class definition.

16. The method of claim 11, wherein said aggregating comprises aggregating corresponding F, L, M and R of a first data block of the set of data blocks with F, L, M and R of a second data block of the set of data blocks to give updated F, L, M and R values that are then aggregated with F, L, M and R of a next data block of the set of data blocks.

17. The method of claim 11, wherein F, L, M and R of two consecutive data blocks resulting from aggregating F, L, M and R of a first data block of the two consecutive data blocks in the set of data blocks (F1, L1, M1 and R1) with F, L, M and R of a second data block of the two consecutive data blocks in the set of data blocks (F2, L2, M2 and R2) is represented by a set of equations as follows:

$$(F,L,M,R)=(F1,L1,M1,R1)+(F2,L2,M2,R2);$$

$$F=F1*F2;$$

$$L=L1+F1*L2;$$

$$M=\max(M1,M2,R1+L2); \text{ and}$$

$$R=R1*F2+R2.$$

* * * * *